United States Patent
Barbieri et al.

(10) Patent No.: US 9,306,638 B2
(45) Date of Patent: Apr. 5, 2016

(54) BACKHAUL ENHANCEMENTS FOR COOPERATIVE MULTI-POINT (COMP) OPERATIONS

(75) Inventors: Alan Barbieri, San Diego, CA (US); Tingfang Ji, San Diego, CA (US); Osok Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 874 days.

(21) Appl. No.: 13/592,818

(22) Filed: Aug. 23, 2012

(65) Prior Publication Data

US 2013/0053078 A1 Feb. 28, 2013

Related U.S. Application Data

(60) Provisional application No. 61/527,475, filed on Aug. 25, 2011.

(51) Int. Cl.
| | | |
|---|---|---|
| *H04B 7/00* | (2006.01) | |
| *H04B 7/02* | (2006.01) | |
| *H04W 72/04* | (2009.01) | |
| *H04B 7/06* | (2006.01) | |

(52) U.S. Cl.
CPC ........... *H04B 7/024* (2013.01); *H04W 72/0426* (2013.01); *H04B 7/0617* (2013.01)

(58) Field of Classification Search
CPC ............................... H04B 7/024; H04B 7/0617
USPC ......... 455/525, 524, 509, 450, 515, 507, 500, 455/517, 445, 67.11, 422.1, 403, 561, 455/562.1, 550.1, 522, 69, 68, 510, 516, 455/426.1, 426.2; 370/328, 329, 310, 338, 370/343
See application file for complete search history.

(56) References Cited

U.S. PATENT DOCUMENTS

| | | | |
|---|---|---|---|
| 2007/0293234 A1* | 12/2007 | Kim et al. | ...... 455/455 |
| 2010/0081448 A1* | 4/2010 | Wong et al. | ...... 455/452.1 |
| 2010/0227606 A1 | 9/2010 | Nan et al. | |
| 2010/0279619 A1 | 11/2010 | Yeh et al. | |
| 2011/0007685 A1* | 1/2011 | Ma et al. | ...... 370/315 |
| 2011/0085448 A1* | 4/2011 | Kuwahara | ...... 370/242 |

(Continued)

OTHER PUBLICATIONS

CMCC: "Discussion on DL DM-RS PRB-bundling", 3GPP Draft; R1-101385 Discussion on DL DM-RS PRB-Bundling, 3RD Generation Partnership Project (3GPP), Mobile Competence Centre; 650, Route Des Lucioles; F-06921 Sophia-Anti Polis Cedex; France, vol. RAN WG1, no. San Franci sco, USA; 20100222, Feb. 17, 2010, XP050418995, [retrieved on Feb. 17, 2010].

(Continued)

*Primary Examiner* — Keith Ferguson
(74) *Attorney, Agent, or Firm* — Patterson & Sheridan, LLP

(57) ABSTRACT

Certain aspects of the present disclosure relate to techniques for backhaul enhancements for cooperative multi-point (CoMP) operations. An aggressor node may take pre-scheduling decisions in advance of beamformed data transmissions based on the pre-scheduling decisions. The aggressor node may communicate the pre-scheduling decisions to one or more victim nodes, for example, via a backhaul link between the aggressor node and the one or more victim nodes. A victim node may take scheduling decisions based at least on the pre-scheduling decisions of the aggressor node to coordinate beamformed transmissions from the victim node with the beamformed transmissions from the aggressor node.

48 Claims, 6 Drawing Sheets

(56) References Cited

U.S. PATENT DOCUMENTS

| | | | |
|---|---|---|---|
| 2011/0086663 | A1 | 4/2011 | Gorokhov et al. |
| 2011/0170427 | A1 | 7/2011 | Koivisto et al. |
| 2011/0170498 | A1 | 7/2011 | Liu et al. |
| 2011/0188599 | A1 | 8/2011 | Kang et al. |
| 2011/0243017 | A1* | 10/2011 | Prasad et al. .................. 370/252 |

OTHER PUBLICATIONS

Dahlman E., et al., "46: LTE/LTE-Advanced for Mobile Broadband" In: "4G: LTE/LTE-Advanced for Mobile Broadband", Mar. 1, 2011, Academic Press, XP55040943, ISBN: 978-0-12-385489-6 pp. 158-161, paragraph [10.2.3.2].

International Search Report and Written Opinion—PCT/US2012/052341—ISA/EPO—Nov. 5, 2012.

Qualcomm Inc: "High level views on CoMP", 3GPP Draft; R1-110355 High-Level Views on CoMP, 3rd Generation Partnership Project (3GPP), Mobile Competence Centre ; 650, Route Des Lucioles ; F-06921 Sophia-Anti Polis Cedex : France. C. Documents Considered to Be Relevant vol. RAN WG1, no.Dulin, Ireland; 20110117-20110121, Jan. 31, 2011, XP050599053, [retrieved on Jan. 31, 2011].

* cited by examiner

BACKHAUL ENHANCEMENTS FOR COOPERATIVE MULTI-POINT (COMP) OPERATIONS

CLAIM OF PRIORITY UNDER 35 U.S.C. §119

The present application for patent claims priority to U.S. Provisional Application No. 61/527,475, entitled "BACKHAUL ENHANCEMENTS FOR COOPERATIVE MULTI-POINT (COMP) OPERATIONS," filed Aug. 25, 2011, and assigned to the assignee hereof and hereby expressly incorporated by reference herein.

BACKGROUND

I. Field

Certain aspects of the disclosure generally relate to wireless communications and, more particularly, to techniques for leveraging a backhaul link between base stations for Cooperative Multi-Point (CoMP) operations.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks and Single-Carrier FDMA (SC-FDMA) networks.

A wireless communication network may include a number of base stations (BS) that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may observe interference due to transmissions from neighbor base stations. On the uplink, a transmission from the UE may cause interference to transmissions from other UEs communicating with the neighbor base stations. The interference may degrade performance on both the downlink and uplink.

SUMMARY

Certain aspects of the present disclosure provide a method for wireless communication by a first base station (BS). The method generally includes making pre-scheduling decisions, at the first BS, the pre-scheduling decisions involving selection of at least one of transmit beams or transmit power for subsequent transmissions from the first base station, and transmitting information regarding the pre-scheduling decisions to at least one second BS for use in coordinating transmissions with transmissions from the first base station.

Certain aspects of the present disclosure provide an apparatus for wireless communication. The apparatus generally includes means for making pre-scheduling decisions involving selection of at least one of transmit beams or transmit power for subsequent transmissions from a first base station, and means for transmitting information regarding the pre-scheduling decisions to at least one second BS for use in coordinating transmissions with transmissions from the first base station.

Certain aspects of the present disclosure provide an apparatus for wireless communication. The apparatus generally includes at least one processor and a memory coupled to the at least one processor. The at least one processor is generally configured to make pre-scheduling decisions involving selection of at least one of transmit beams or transmit power for subsequent transmissions from a first base station, and transmit information regarding the pre-scheduling decisions to at least one second BS for use in coordinating transmissions with transmissions from the first base station.

Certain aspects of the present disclosure provide a computer program product for wireless communication. The computer program product generally includes a computer-readable medium comprising code for making pre-scheduling decisions involving selection of at least one of transmit beams or transmit power for subsequent transmissions from a first base station, and transmitting information regarding the pre-scheduling decisions to at least one second BS for use in coordinating transmissions with transmissions from the first base station.

Certain aspects of the present disclosure provide a method for wireless communication. The method generally includes receiving information regarding pre-scheduling decisions from a first base station (BS) at a second BS, and making scheduling decisions at the second BS based at least on the received pre-scheduling decisions to coordinate transmissions from the second BS with transmissions from the first BS.

Certain aspects of the present disclosure provide an apparatus for wireless communication. The apparatus generally includes means for receiving information regarding pre-scheduling decisions from a first base station (BS) at a second BS, and means for making scheduling decisions at the second BS based at least on the received pre-scheduling decisions to coordinate transmissions from the second BS with transmissions from the first BS.

Certain aspects of the present disclosure provide an apparatus for wireless communication. The apparatus generally includes at least one processor and a memory coupled to the at least one processor. The at least one processor is generally configured to receive information regarding pre-scheduling decisions from a first base station (BS) at a second BS, and make scheduling decisions at the second BS based at least on the received pre-scheduling decisions to coordinate transmissions from the second BS with transmissions from the first BS.

Certain aspects of the present disclosure provide a computer program product for wireless communication. The computer program product generally includes a computer-readable medium comprising code for receiving information regarding pre-scheduling decisions from a first base station (BS) at a second BS, and making scheduling decisions at the second BS based at least on the received pre-scheduling decisions to coordinate transmissions from the second BS with transmissions from the first BS.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
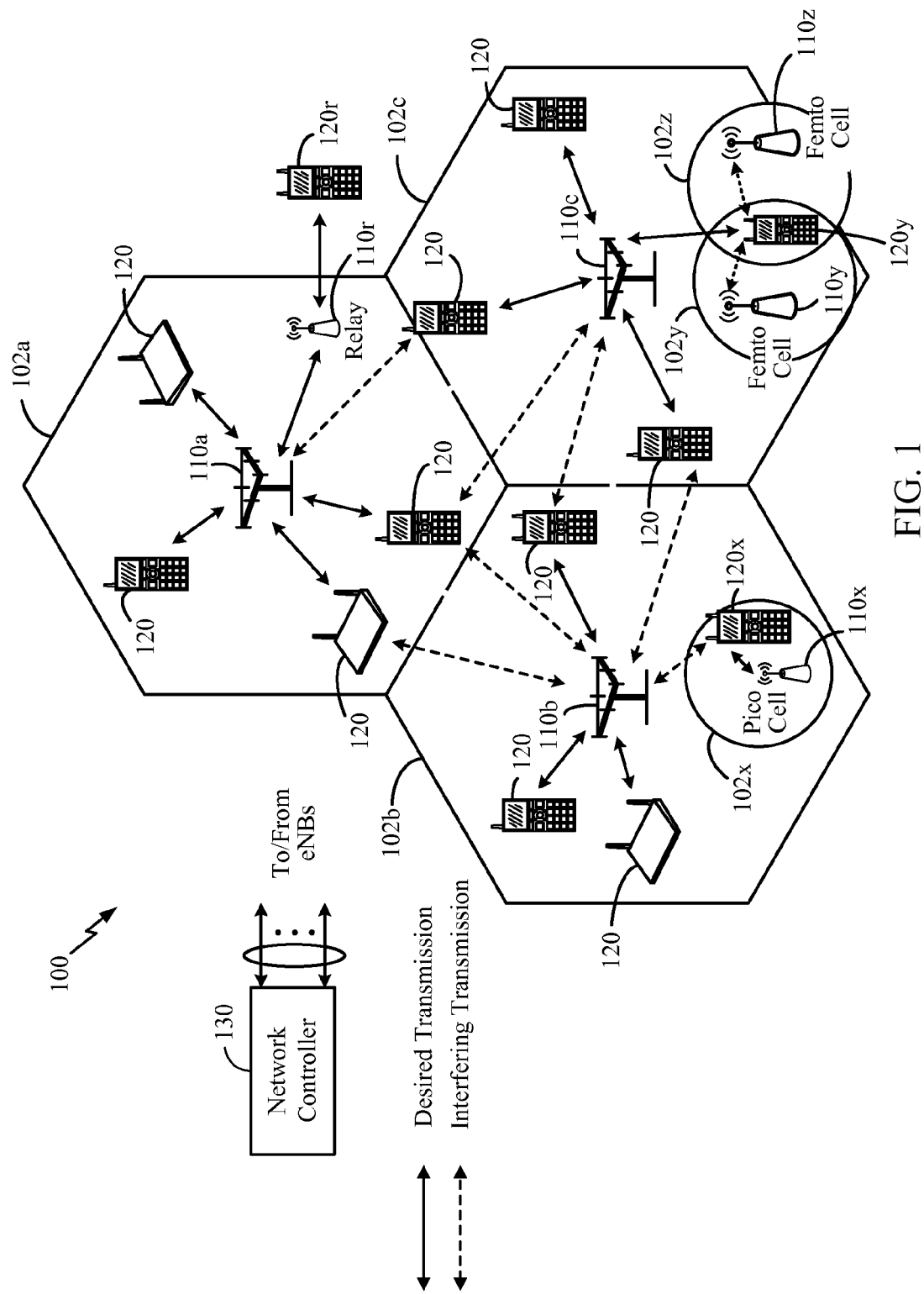
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (i.e., a macro base station). An eNB for a pico cell may be referred to as a pico eNB (i.e., a pico base station). An eNB for a femto cell may be referred to as a femto eNB (i.e., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
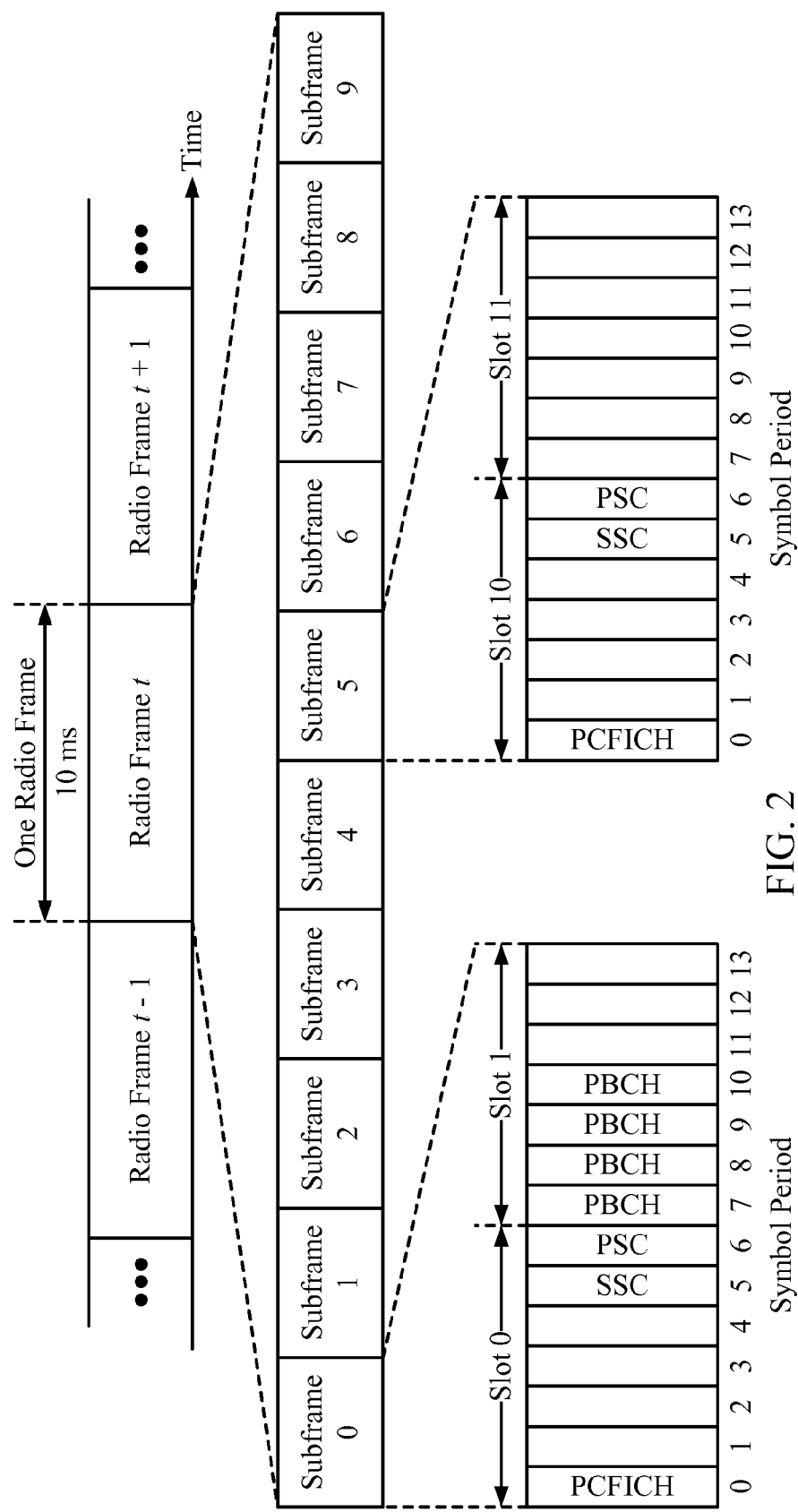
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
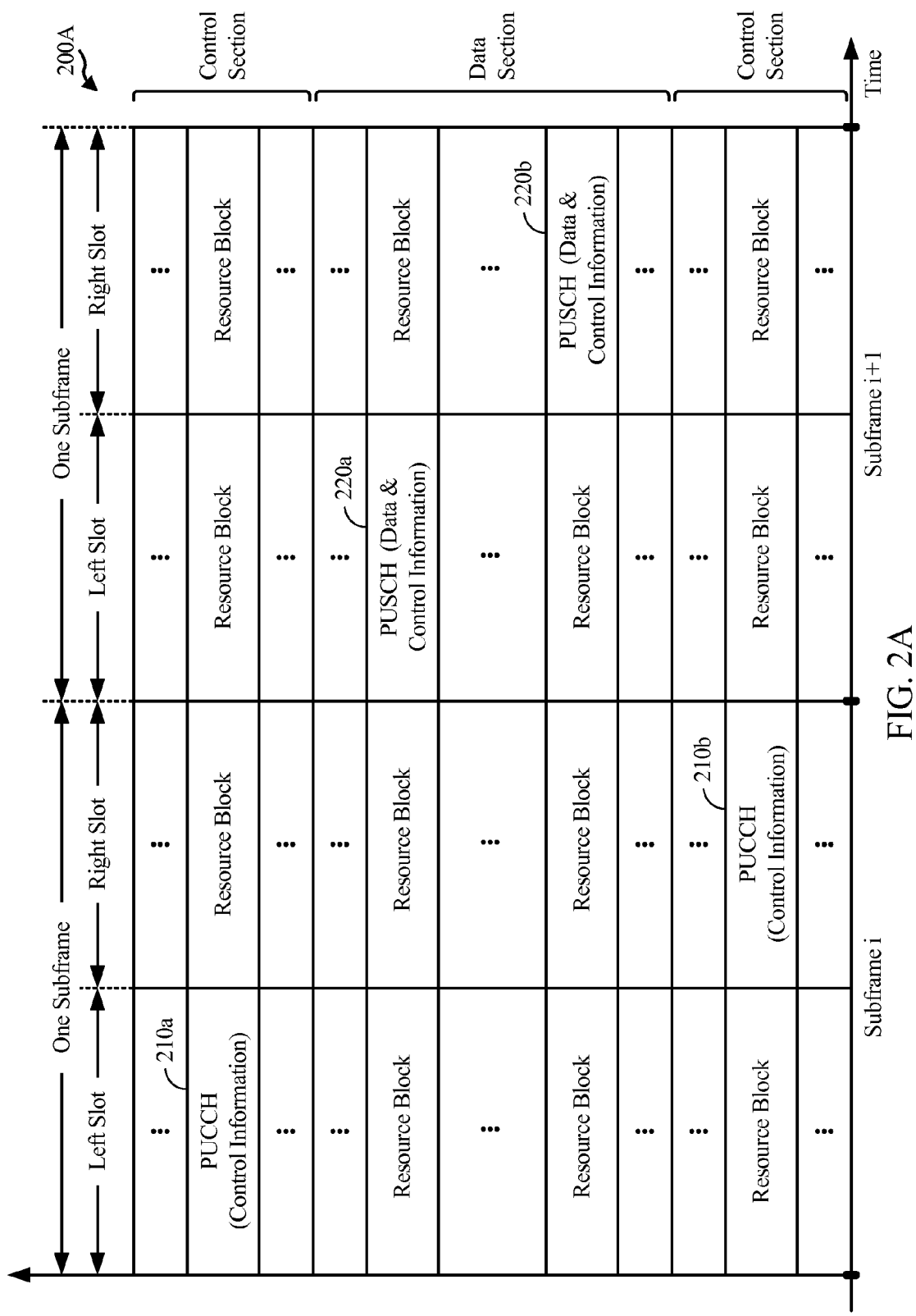
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110*z* also with lower received power (not shown in FIG. 1). UE 120*y* may then observe high interference from femto eNB 110*y* on the downlink and may also cause high interference to eNB 110*y* on the uplink.

A dominant interference scenario may also occur due to range extension, which is a scenario in which a UE connects to an eNB with lower pathloss and lower SNR among all eNBs detected by the UE. For example, in FIG. 1, UE 120*x* may detect macro eNB 110*b* and pico eNB 110*x* and may have lower received power for eNB 110*x* than eNB 110*b*. Nevertheless, it may be desirable for UE 120*x* to connect to pico eNB 110*x* if the pathloss for eNB 110*x* is lower than the pathloss for macro eNB 110*b*. This may result in less interference to the wireless network for a given data rate for UE 120*x*.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (i.e., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 3:
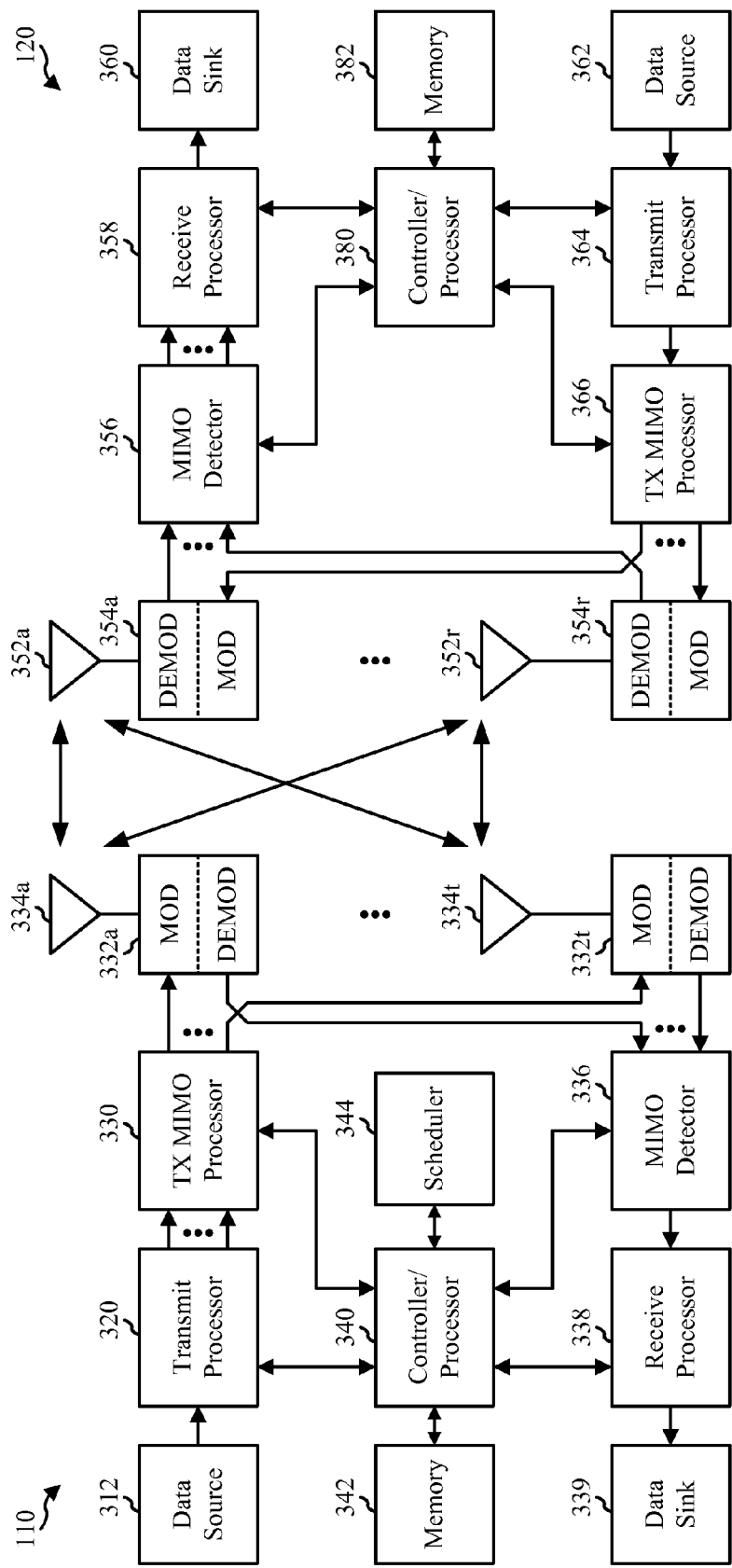
FIG. 3 shows a block diagram conceptually illustrating an example of a Node B in communication with a user equipment device (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110*c* in FIG. 1, and the UE 120 may be UE 120*y*. The eNB 110 may also be a base station of some other type. The eNB 110 may be equipped with T antennas 334*a* through 334*t*, and the UE 120 may be equipped with R antennas 352*a* through 352*r*, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332*a* through 332*t*. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332*a* through 332*t* may be transmitted via T antennas 334*a* through 334*t*, respectively.

At the UE 120, antennas 352*a* through 352*r* may receive the downlink signals from the eNB 110 and may provide received signals to demodulators (DEMODs) 354*a* through 354*r*, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354*a* through 354*r*, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be precoded by a TX MIMO processor 366 if applicable, further processed by modulators 354*a* through 354*r* (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors and modules at the eNB 110 may perform or direct operations and/or processes for the techniques described herein. The memories 342 and 382 may store data and program codes for the eNB 110 and the UE 120, respectively. A scheduler 344 may schedule UEs for data transmission on the downlink and/or uplink.

Coordinated Multi-Point (CoMP) Transmission and Reception

In a multi-cell configuration, a UE (e.g., UE 120) may communicate with multiple base stations or cells (e.g., base stations 110) simultaneously to transmit and/or receive data. In one aspect, a multi-cell configuration may be a coordinated multi-point (CoMP) configuration wherein joint processing and/or coordinated scheduling (CS)/coordinated beamforming (CBF) may employed. For example, in a joint processing CoMP configuration on the downlink, physical downlink shared channel (PDSCH) data (e.g., downlink user data) may be available at multiple points. PDSCH transmissions may be joint transmissions in which PDSCH data is transmitted from multiple points. In addition, PDSCH transmission may be based upon a dynamic cell selection scheme in which PSDCH data is transmitted from one point at a given time.

For example, turning to FIG. 1, a joint processing downlink CoMP configuration may be implemented by a CoMP cooperating set including macro eNB 110*b* and pico eNB 110*x* serving UE 120*x*. The CoMP cooperating set generally includes a plurality of cells or base stations (e.g. macro, pico, femto etc.), potentially geographically separated, which coordinate to provide wireless communication services to a UE. In an example, eNBs 110*b* and 110*x* may coordinate to jointly transmit downlink data to UE 120*x*. In another example, eNBs 110*b* and 110*x* may coordinate such that the base station having the greatest instantaneous channel quality transmits downlink data to UE 120*x*.

eNBs 110*b* and 110*x* may further coordinate to implement scheduling and/or beamforming decisions. For instance, downlink data for UE 120*x* may be available at the UE's serving cell (e.g. pico cell 102*x*), however, scheduling decisions impacting UE 120*x* account for information provided by other members of the CoMP cooperating set, such as eNB 110*b*. eNB 110*x* may schedule UE 120*x* to avoid potential downlink interference from transmissions in non-serving cell 102*b* and/or eNB 110*x* may suppress transmissions in the non-serving cell 102*b* based upon information provided by eNB 110*b* via a backhaul link (not shown) between the eNBs 110*b* and 110*x*.

It is to be appreciated that CoMP techniques may be applied on uplink transmissions in addition to downlink transmissions. For instance, eNBs 110*b* and 110*x* may coordinate to receive uplink transmissions from UE 120*x* in a joint manner. In an example, eNBs 110*b* and 110*x* may receive an uplink data packet from the UE 120*x*. Both eNBs 110*b* and 110*x* may independently attempt to demodulate and decode the uplink packet. eNB 110*b* and/or eNB 110*x* may exchange decoded data packets and employ packet combining to improve reliable reception of the uplink packet. In another aspect, eNBs 110*b* and 110*x* may exchange information via the backhaul link, wherein the exchanged information may be utilized to enhance scheduling decisions. For example, UE 120*x* may reside at a cell edge between serving cell 102*x* and non-serving cell 102*b*. eNB 110*b* may provide information regarding UEs within the non-serving cell 102*b* and in proximity to UE 120*x*. eNB 110*x* may utilize the information to schedule UE 120*x* on the uplink such that interference to/from neighboring cells is reduced.

To support CoMP operations, UE 120*x* may report feedback information to members of a CoMP reporting set. The CoMP reporting set may include all members of the CoMP cooperating set or a portion thereof. The feedback information may include channel state information (CSI), and/or sounding reference signals which may be utilized for uplink scheduling and/or channel estimation via channel reciprocity. In accordance with an aspect, sounding reference signal transmissions may be configured with a set of parameters and transmit power may be controlled such that the sounding reference signal is received by members of a CoMP cooperating set with a reasonable carrier-to-interference ratio.

Example Backhaul Enhancements for Cooperative
Multi-Point (COMP) Operations

In certain aspects, performance of a UE at cell edges may be significantly improved through downlink CoMP in which multiple nodes (or base stations/eNBs) cooperate for serving a UE. In a coordinated scheduling (CS) and coordinated beam-forming (CBF), only the serving cell has the data packets for the UE. CS and CBF generally involve suitable UE selection by a base station, beam selection, power control (for example, Boolean, wherein interferer is transmitting using full power or silenced on some resources), and improved link adaptation.

Aspects of the present disclosure provide methods for feedback enhancements for CS/CBF schemes. A "victim" BS (e.g., pico in a macro-pico scenario) may make scheduling decisions conditioned on one or more interfering "aggressor" BSs (e.g., macros). Namely, a victim BS may implicitly or explicitly know the scheduling decisions (e.g., beams and transmission powers) of neighboring aggressor BSs and may take this information into considering when coordinating beamformed transmissions with neighbor BSs.

In certain aspects, all or a subset of nodes make scheduling decisions prior to transmission. Generally, interference experienced by a UE depends on transmission powers and beams employed by interferers. The UE periodically reports CSI (or CQI), which reflects scheduling decisions (e.g., transmission powers and beams) of interfering, neighbor cells. The UE may determine CSI based on data or reference signals (RS) (e.g., CSI-RS) transmitted by the interferers on resource elements (REs). However, the interference experienced by the UE may be unpredictable as interfering cells may change beams and transmit power on a transmission time interval (TTI) basis. This may create a mismatch in the reported CSI based on RS, and the actual interference experienced during data transmissions (e.g. PDSCH data transmissions) due to the one or more interferers changing beams and/or transmission powers for transmission.

A more accurate knowledge of interference at the time of transmission by a serving BS (e.g., estimated interference matches actual interference at the time of the transmission) may increase performance. Increased performance may occur due to improved beam selection, link adaption, and multiuser diversity (MUD) gain. For example, a more accurate knowledge of interference experienced at a UE by one or more neighbor base stations may improve a UE's CSI estimate. Additionally, a more accurate knowledge of interference may allow beam selection such that the transmit signal from the serving BS and interference from the neighbor base stations are orthogonal.

In certain aspects, one or more aggressor BSs (e.g., aggressor macros) may take scheduling decisions (or pre-scheduling decisions) in advance (e.g., x ms in advance) of an actual transmission based on the scheduling decisions. For example, an aggressor BS may select transmission beam and transmission power for a future transmission x ms later using the selected transmission beam and transmission power. In an aspect, the scheduling decisions may apply to multiple subframes in the future. The aggressor may transmit reference signals (e.g., CSI-RS) using the selected transmission beam and transmission power for CSI reporting by CoMP UEs. In an aspect, each victim BS (e.g. victim pico) may take scheduling decisions based on the aggressor's scheduling decisions and/or CSI reported by the UEs served by the victim BS. In an aspect, the x ms time may be selected to account for the time taken by a UE to estimate and report CSI based on received CSI-RS from an aggressor, time taken by the victims to decode the reported CSIs from CoMP UEs, CSI-RS reporting periodicity etc.

Figure 4:
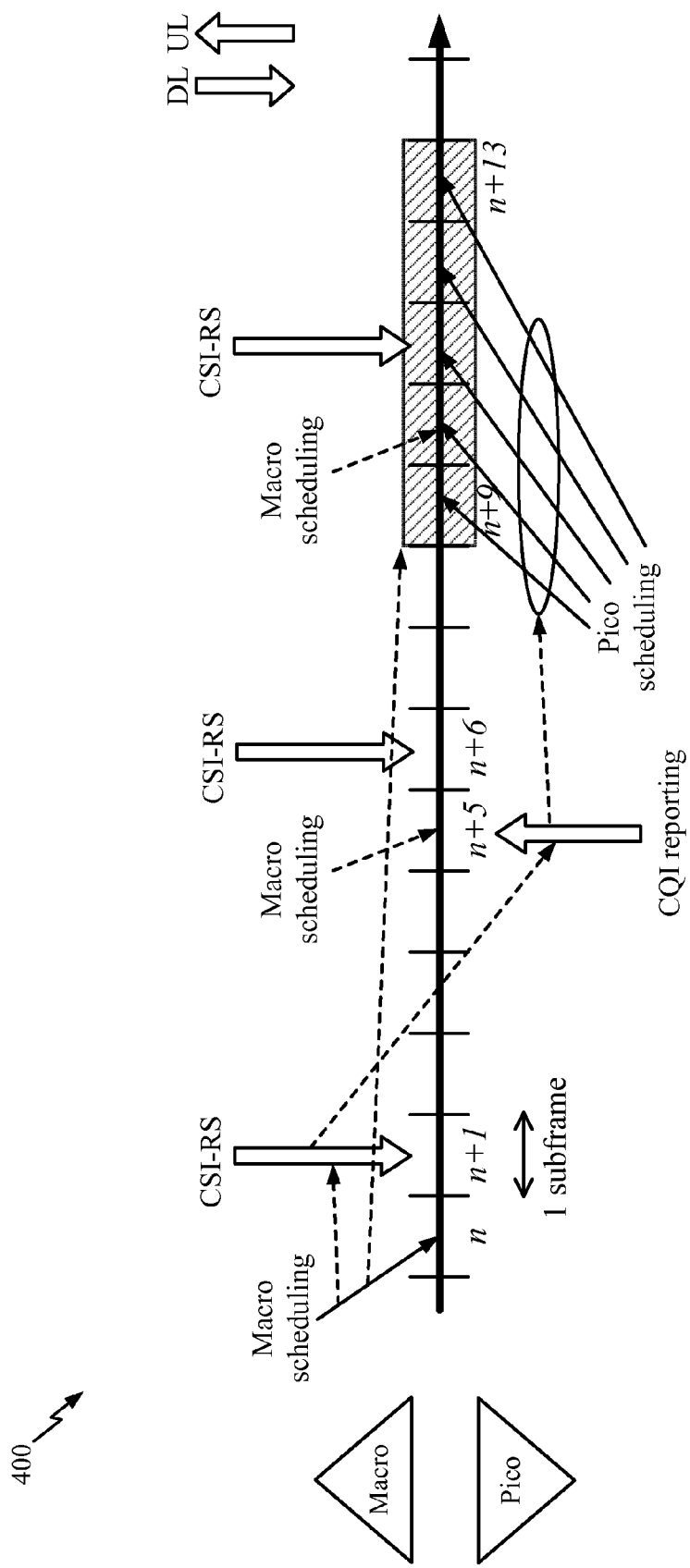
FIG. 4 illustrates an example timeline of coordinated beam forming (CBF) between an aggressor macro node and a victim pico node, in accordance with certain aspects of the present disclosure.

FIG. 4 illustrates an example timeline 400 of coordinated beam forming (CBF) between an aggressor macro node and a victim pico node. For illustrative purposes only, the example assumes a 5 ms CSI reporting periodicity from CoMP UEs and 5 ms CSI-RS transmission periodicity from the macro node. The macro node makes scheduling decisions every 5 ms. For example, the macro node makes scheduling decisions at subframe n (n+5, n+10, etc.). At subframe n+1 (n+6, n+11, etc.), the macro node transmits CSI-RS on pre-determined REs, for example, using beams and transmission power selected at step 1. UEs served by the pico, may then calculate Channel Quality Indicator (CQI) (based on CSI-RS at step 2) and report to the pico at subframe n+5 (n+10, etc.). Subsequently, the macro node B may transmit data (e.g., PDSCH data) according to the scheduling decisions made at subframe n, carried out at time n+9 to n+13. The pico node may make scheduling decisions based on the reported CQI and/or pre-scheduling information from the macro node, and transmit at time n+9 to n+13 (persistency is not required), for example, with beams selected to account for the beams selected by the macro node.

In certain aspects, the macro node may transmit information regarding the pre-scheduling decisions to the pico node (e.g., via a backhaul link). The information may include all information required by the destination pico node to determine interference caused by the source macro node to UEs served by the destination pico node. The information regarding the pre-scheduling may comprise at least one of a downlink transmission power, a transmit beam, a transmission rank, and time-frequency resources these decisions refer to. In an aspect, the pico node may take scheduling decisions based on the received pre-scheduling information and/or CSI reported by served UEs.

In some cases, the pre-scheduling decisions (e.g., transmit beams and powers) may be constant across sets of N consecutive physical resource blocks (PRBs), wherein N is a PRB bundling size. Thus, the interference may change slowly across those PRBs, for example, only due to frequency-selecting fading. In an aspect, the pre-scheduling information transmitted from the macro node to the pico node may include the PRB bundling size N.

In certain aspects, the serving pico may pass on the information regarding the PRB bundling size N to its served UEs (e.g., via a Radio Resource Control (RRC) Information Element (IE)), which may use this information to determine interference. For example, the UE may use the information to decide how many consecutive PRBs to average when estimating interference. In an aspect, if a UE has multiple aggressors and each of them is using a different PRB bundling size, the RRC message may include a list of bundling sizes (optionally with cell IDs of corresponding aggressor cells). Alternatively, the serving cell may select one common value, for example, the minimum among the bundling sizes used by most dominant aggressors for that UE. In a further aspect, the PRB bundling sizes of neighboring nodes may be selected such that the bundling is substantially the same for the nodes. The PRB bundling may be selected via backhaul negotiation between the neighboring nodes.

In an aspect, the larger is the N, the better may be the interference estimate at the UEs. However, a larger N may entail performance degradation for the aggressor BSs, depending on number of UEs, transmission mode, traffic, frequency selectivity of the channel etc.

An aggressor node (e.g., macro node) may independently decide its PRB bundling size N and inform the neighboring victim nodes (e.g., pico nodes). The macro node may also receive information from the at least one other BS (e.g., victim pico node) and select the PRB bundling size N based on the information received from the at least one other BS. The information received from the at least one other BS may comprise at least one of active CoMP UEs and an expected interference estimation accuracy for the active CoMP UEs.

In certain aspects, the victim picos may forward (e.g., via a backhaul link) the CSIs reported by their respective served UEs to the aggressor node(s). The CSI may be used by an aggressor node to determine the UEs associated to a victim node, that are affected (e.g., in terms of interference) by the aggressor node. In an aspect, only those UEs taking part in the CoMP configuration, for example, which reported CSI from the aggressor even though connected with the victim, may be considered for CSI forwarding. The UEs considered for CSI forwarding may include all RRC_connected UEs, scheduled UEs (e.g., if the CSI forwarding message is transmitted along with scheduling information of the victim node), or a subset of UEs (e.g., selected in round-robin fashion).

In an aspect, the encoding used to forward the CSIs may be same as for over-the-air (OTA) CSI reporting from a UE to eNB. The frequency granularity of the CSI forwarding messages may also be same as for the OTS CSI reporting. In an aspect, if backhaul capacity is a concern, only a subset of subbands may be reported. The time granularity for the CSI forwarding messages may be per transmission time interval (TTI), for example, if the CSI forwarding message is transmitted along with scheduling information of the victim node. Alternatively, the time granularity may be periodic, wherein the periodicity may depend on CSI speed of change. The periodicity may also depend on periodicity for OTS CSI reporting.

In certain aspects, a special beamformed CSI-RS (e.g., RQI-RS) configuration may be used for CSI estimation by victim UEs. This special CSI-RS configuration may be shared among the BSs, for example via a backhaul link between the BSs. In an aspect, at the first transmission of such CSI-RS after pre-scheduling by an aggressor macro node, the macro node may transmit a pseudo-random sequence on the CSI-RS REs according to the beams and transmission powers selected by the pre-scheduling macro node. The victim UEs may use these REs to estimate interference from the macro node.

In certain aspects, certain nodes in a CoMP configuration may behave both as victim and aggressor nodes. For example, a pico node may be an aggressor to another pico node (e.g., inter-pico interference), and a victim for another pico or macro node. In inter-pico interference scenarios, the interference estimated by a UE associated to a pico node may need to include interference from neighbor pico nodes as well (besides interference from aggressor macro nodes). This may be accomplished by using different muted CSI-RS patterns for neighboring nodes. Generally, serving cell does not transmit on certain REs corresponding to a particular muted CSI-RS patterns, while all other cells are transmitting. So the UE associated to the serving cell may determine the interference from all the interferers based on the beams and the TX powers used by them. The rationale typically is that the energy on the muted tones captures as much of the overall interference as possible (ideally, from all nodes except the serving node). In an aspect, adjacent nodes may mute on different CSI-RS configurations.

However, in certain aspects, only a finite set of CSI-RS configurations are available. Thus, CSI-RS configurations may be re-used. In an aspect, a static coloring through operation and maintenance (OAM) may be used, such that neighboring nodes mute on different CSI-RS configurations. Alternatively, autonomous coloring via X2 negotiation (e.g., via backhaul links between nodes) may be used to select different muted CSI-RS configurations for neighboring nodes. In an aspect, information exchange between nodes may include presence/absence of CoMP UEs and Reference Signal Received Power (RSRP) reported by CoMP UEs from non-serving cells (e.g. non-serving pico cells to determine impact of pico interference). Based on this information, each node may build an interference graph for the UEs and may select an appropriate CSI-RS configuration and inform the configuration to other nodes (e.g., via the backhaul links).

In certain aspects, if an aggressor node has delay-sensitive traffic, it may decide to set aside some non-CoMP resources (e.g., in the frequency and/or time domain) where scheduling may be instantaneous. Such resources may be used to schedule delay-sensitive traffic. The victim nodes may need to know whether and which resources used by the aggressor node is non-CoMP. In certain aspects, each aggressor node may define a resource assignment including CoMP and non-CoMP resources and inform victim nodes of the resource assignment, for example, via backhaul links between the aggressor node and the victim nodes. In an aspect, the aggressor node may receive information from one or more victim nodes and use the received information for defining the resource assignment. The information may include number of CoMP active UEs and average loading on CoMP resources. In an aspect, the resource assignment may adaptively be changed, for example, based on the information received from the victim nodes.

Figure 5:
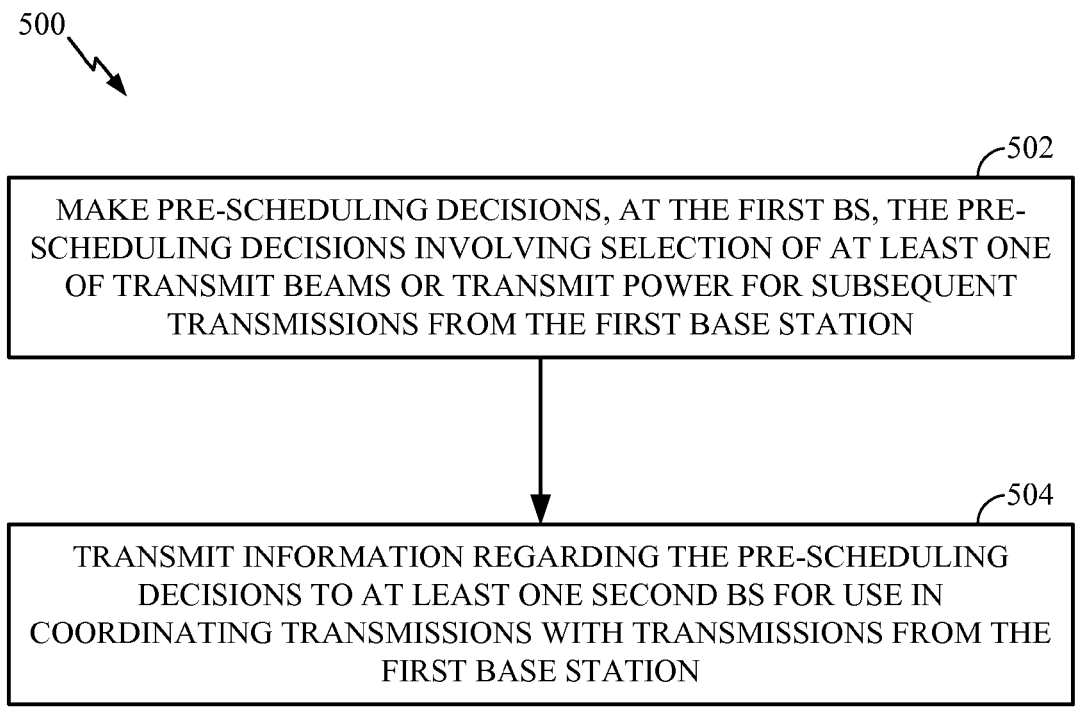
FIG. 5 illustrates example operations that may be performed by an aggressor evolved node B (eNB), in accordance with certain aspects of the present disclosure.

FIG. 5 illustrates example operations 500 that may be performed by an aggressor evolved node B (eNB) in accordance with certain aspects of the disclosure. The operations 500 may begin, at 502, by making pre-scheduling decisions, at a first base station (BS), the pre-scheduling decisions involving selection of at least one of transmit beams or transmit power for subsequent transmissions from the first base station. At 504, information regarding the pre-scheduling decisions may be transmitted to a second base station for use in coordinating transmissions with transmissions from the first base station.

Figure 6:
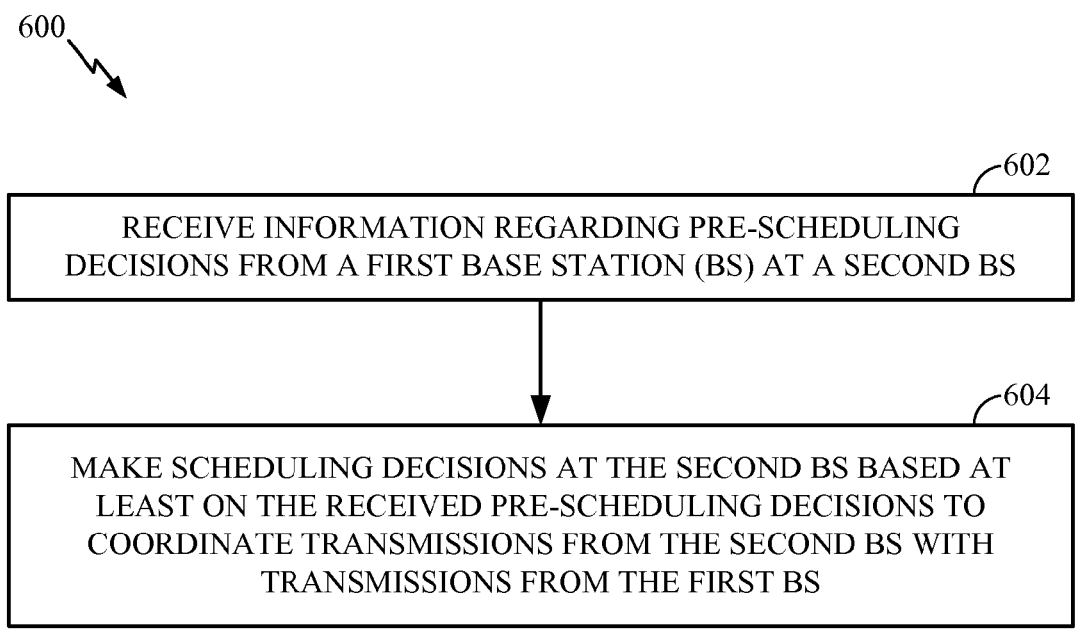
FIG. 6 illustrates example operations that may be performed by a victim evolved node B (eNB), in accordance with certain aspects of the present disclosure.

FIG. 6 illustrates example operations 600 that may be performed by a victim evolved node B (eNB) in accordance with certain aspects of the disclosure. The operations 600 may begin, at 602, by receiving information regarding pre-scheduling decisions from a first base station (BS) at a second base station. At 604, scheduling decisions may be made at the second BS based at least on the received pre-scheduling decisions to coordinate transmissions from the second BS with transmissions from the first BS.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communication, by a first base station (BS) comprising:
    making pre-scheduling decisions, at the first BS, the pre-scheduling decisions involving selection of at least one of transmit beams or transmit power for subsequent transmissions from the first BS; and
    transmitting information regarding the pre-scheduling decisions to at least one second BS for use in coordinating transmissions with transmissions from the first BS,
    wherein the pre-scheduling decisions are constant across sets of N consecutive physical resource blocks (PRBs), wherein N is a PRB bundling size.

2. The method of claim 1, wherein the information regarding the pre-scheduling decisions comprises the PRB bundling size N.

3. The method of claim 1, wherein the first BS independently decides the PRB bundling size N.

4. The method of claim 1, further comprising:
    receiving information at the first BS from the at least one second BS; and
    selecting the PRB bundling size N at the first BS based on the information received from the at least one second BS,
    wherein the information received from the at least one second BS comprises at least one of active cooperative multi-point (CoMP) user equipments (UEs) or an expected interference estimation accuracy for the active CoMP UEs.

5. The method of claim 1, wherein the first BS decides the PRB bundling size N via negotiation with the at least one second BS.

6. The method of claim 1, further comprising:
    making scheduling decisions at the at least one second BS based at least in part on the information regarding the pre-scheduling decisions received from the first BS.

7. The method of claim 1, wherein the information regarding the pre-scheduling decisions comprises at least one of a downlink transmission power, a transmit beam, a transmission rank, and time-frequency resources these decisions refer to.

8. The method of claim 1, wherein the information regarding the pre-scheduling decisions is usable by the at least one second BS to determine interference caused by the first BS to user equipments (UEs) served by the at least one second BS.

9. The method of claim 1, further comprising:
    receiving, at the first BS, channel state information (CSI) from the at least one second BS reported by user equipments (UEs) served by the at least one second BS.

10. The method of claim 9, wherein the CSI is usable by the first BS for determining an amount of interference caused by the first BS to the UEs served by the at least one second BS.

11. The method of claim 1, wherein the information regarding the pre-scheduling decisions comprises an indication of a subset of time-frequency resources, and wherein standard scheduling is carried out on a remaining subset of the time-frequency resources.

12. The method of claim 1, wherein the information regarding the pre-scheduling decisions comprises an indication of cooperative multi-point (CoMP) resources and non-CoMP resources.

13. The method of claim 1, wherein the information regarding the pre-scheduling decisions is transmitted over a backhaul link connecting the first and the at least one second BS.

14. The method of claim 1, further comprising:
    defining configuration for a special beamformed reference signal for use in interference estimation by user equipments (UEs) associated to the at least one second BS.

15. The method of claim 14, wherein the information regarding the pre-scheduling decisions comprises information regarding the special beamformed reference signal.

16. The method of claim 1, wherein coordinating transmissions with transmissions from the first BS comprises coordinating beamformed transmissions with beamformed transmissions from the first BS.

17. A method for wireless communication by a first base station (BS) comprising:
    making pre-scheduling decisions, at the first BS, the pre-scheduling decisions involving selection of at least one of transmit beams or transmit power for subsequent transmissions from the first BS;
    transmitting information regarding the pre-scheduling decisions to at least one second BS for use in coordinating transmissions with transmissions from the first BS; and
    exchanging information with the at least one second BS to select a configuration for Channel State Information-Reference Signal (CSI-RS) for the first BS that is different from the CSI-RS configuration used by the at least one second BS.

18. The method of claim 17, wherein the exchanged information comprises information regarding presence or absence of cooperative multi-point (CoMP) user equipments (UEs) and Reference Signal Received Power (RSRP) reported by the CoMP UEs from non-serving cells.

19. The method of claim 17, wherein the CSI-RS configuration comprises a muted CSI-RS configuration.

20. The method of claim 19, wherein selecting the CSI-RS configuration for the first BS different from the CSI-RS configuration used by the at least one second BS comprises selecting a muted CSI-RS configuration that mutes on resources different from the resources on which a muted CSI-RS configuration of the at least one second BS mutes.

21. An apparatus for wireless communication, comprising:
    at least one processor configured to:
        make pre-scheduling decisions involving selection of at least one of transmit beams or transmit power for subsequent transmissions from a first BS; and
        transmit information regarding the pre-scheduling decisions to at least one second BS for use in coordinating transmissions with transmissions from the first BS,
        wherein the pre-scheduling decisions are constant across sets of N consecutive physical resource blocks (PRBs), wherein N is a PRB bundling size, and
    a memory coupled to the at least one processor.

22. The apparatus of claim 21, wherein the first BS decides the PRB bundling size via negotiation with the second BS.

23. The apparatus of claim 21, wherein coordinating transmissions with transmissions from the first BS comprises coordinating beamformed transmissions with beamformed transmissions from the first BS.

24. An apparatus for wireless communication, comprising:
at least one processor configured to:
make pre-scheduling decisions involving selection of at least one of transmit beams or transmit power for subsequent transmissions from a first BS;
transmit information regarding the pre-scheduling decisions to at least one second BS for use in coordinating transmissions with transmissions from the first BS; and
exchange information with the at least one second BS to select a configuration for Channel State Information-Reference Signal (CSI-RS) for the first BS that is different from the CSI-RS configuration used by the at least one second BS; and
a memory coupled to the at least one processor.

25. A method for wireless communication, comprising:
receiving information regarding pre-scheduling decisions from a first base station (BS) at a second BS; and
making scheduling decisions at the second BS based at least on the received information to coordinate transmissions from the second BS with transmissions from the first BS,
wherein the pre-scheduling decisions are constant across sets of N consecutive physical resource blocks (PRBs), wherein N is a PRB bundling size.

26. The method of claim 25, further comprising:
making scheduling decisions at the second BS based on Channel State Information (CSI) reported by at least one UE.

27. The method of claim 25, wherein the information regarding the pre-scheduling decisions comprises the PRB bundling size N.

28. The method of claim 25, wherein the first BS independently decides the PRB bundling size N.

29. The method of claim 25, further comprising:
transmitting information to the first BS from the second BS, the information comprising at least one of active cooperative multi-point (CoMP) UEs or an expected interference estimation accuracy for the active CoMP UEs,
wherein the first BS selects the PRB bundling size N based on the information received from the second BS.

30. The method of claim 25, wherein the first BS decided the PRB bundling size N via negotiation with the second BS.

31. The method of claim 25, wherein the information regarding the pre-scheduling decisions comprises at least one of a downlink transmission power, a transmit beam, a transmission rank, or time-frequency resources these decisions refer to.

32. The method of claim 25, wherein the information regarding the pre-scheduling decisions is usable by the second BS to determine interference caused by the first BS to at least one UE served by the second BS.

33. The method of claim 25, further comprising:
receiving at the second BS channel state information (CSI) reported by at least one UE; and
transmitting the CSI of the at least one UE to the first BS from the second BS.

34. The method of claim 33, wherein the CSI is usable by the first BS for determining an amount of interference caused by the first BS to the at least one UE.

35. The method of claim 25, wherein the information regarding the pre-scheduling decisions comprises an indication of a subset of time-frequency resources, and wherein standard scheduling is carried out on a remaining subset of the time-frequency resources.

36. The method of claim 25, wherein the information regarding the pre-scheduling decisions comprises an indication of cooperative multi-point (CoMP) resources and non-CoMP resources.

37. The method of claim 25, wherein the information regarding the pre-scheduling decisions is received over a backhaul link connecting the first and the second base stations.

38. The method of claim 25, wherein the information regarding the pre-scheduling decisions comprises configuration for a special beamformed reference signal for use in interference estimation by user equipments (UEs) associated to the second BS.

39. The method of claim 25, wherein coordinating transmissions from the second BS with transmissions from the first BS comprises coordinating beamformed transmissions from the second BS with beamformed transmissions from the first BS.

40. A method for wireless communication, comprising:
receiving information regarding pre-scheduling decisions from a first base station (BS) at a second BS;
making scheduling decisions at the second BS based at least on the received information to coordinate transmissions from the second BS with transmissions from the first BS; and
exchanging information with the first BS to select a configuration for Channel State Information-Reference Signal (CSI-RS) for the second BS that is different from the CSI-RS configuration used by the first BS.

41. The method of claim 40, wherein the exchanged information comprises information regarding presence or absence of cooperative multi-point (CoMP) user equipments (UEs) and Reference Signal Received Power (RSRP) reported by the CoMP UEs from non-serving cells.

42. The method of claim 40, wherein the CSI-RS configuration comprises a muted CSI-RS configuration.

43. The method of claim 42, wherein selecting the CSI-RS configuration for the second BS different from the CSI-RS configuration used by the first BS comprises selecting a muted CSI-RS configuration that mutes on resources different from the resources on which a muted CSI-RS configuration of the first BS mutes.

44. An apparatus for wireless communication, comprising:
at least one processor configured to:
receive information regarding pre-scheduling decisions from a first base station (BS) at a second BS;
make scheduling decisions at the second BS based at least on the received information to coordinate transmissions from the second BS with transmissions from the first BS; and
exchange information with the first BS to select a configuration for Channel State Information-Reference Signal (CSI-RS) for the second BS that is different from the CSI-RS configuration used by the first BS; and
a memory coupled to the at least one processor.

45. An apparatus for wireless communication, comprising:
at least one processor configured to:
receive information regarding pre-scheduling decisions from a first base station (BS) at a second BS; and make scheduling decisions at the second BS based at least on the received information to coordinate transmissions from the second BS with transmissions from the first BS, wherein the pre-scheduling decisions are constant across sets of N consecutive physical resource blocks (PRBs), wherein N is a PRB bundling size, and a memory coupled to the at least one processor.

46. The apparatus of claim 45, wherein the at least one processor is configured to make scheduling decisions at the second BS based on Channel State Information (CSI) reported by at least one UE.

47. The apparatus of claim 45, wherein the first BS decided its PRB bundling size via negotiation with the second BS.

48. The apparatus of claim 45, wherein coordinating transmissions from the second BS with transmissions from the first BS comprises coordinating beamformed transmissions from the second BS with beamformed transmissions from the first BS.

* * * * *